US011573619B2

(12) United States Patent
Nakamura et al.

(10) Patent No.: US 11,573,619 B2
(45) Date of Patent: Feb. 7, 2023

(54) INFORMATION PROCESSING APPARATUS AND METHOD

(71) Applicant: Lenovo (Singapore) Pte. Ltd., Singapore (SG)

(72) Inventors: Atsunobu Nakamura, Kanagawa (JP); Akinori Uchino, Kanagawa (JP); Hiroki Oda, Kanagawa (JP); Hajime Yoshizawa, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/123,471

(22) Filed: Dec. 16, 2020

(65) Prior Publication Data

US 2022/0066530 A1 Mar. 3, 2022

(30) Foreign Application Priority Data

Aug. 25, 2020 (JP) .............................. JP2020-142022

(51) Int. Cl.
*G06F 1/26* (2006.01)
*G06F 1/32* (2019.01)
*G06F 1/3228* (2019.01)
*G06F 1/3296* (2019.01)
*G06F 11/30* (2006.01)
*G06F 1/20* (2006.01)
*G06F 1/329* (2019.01)

(52) U.S. Cl.
CPC ............ *G06F 1/3228* (2013.01); *G06F 1/203* (2013.01); *G06F 1/329* (2013.01); *G06F 1/3296* (2013.01); *G06F 11/3062* (2013.01)

(58) Field of Classification Search
CPC ..................................................... G06F 1/3228
See application file for complete search history.

(56) References Cited

U.S. PATENT DOCUMENTS

| 4,458,331 | A | * | 7/1984 | Amezcua | .............. | G06F 3/0489 |
| | | | | | | 715/804 |
| 8,028,060 | B1 | * | 9/2011 | Wyld | .................. | H04L 43/0805 |
| | | | | | | 709/224 |
| 10,585,466 | B1 | * | 3/2020 | Lin | ........................ | G06F 1/206 |

(Continued)

FOREIGN PATENT DOCUMENTS

JP          4448101 B2    4/2010

*Primary Examiner* — Mohammed H Rehman
(74) *Attorney, Agent, or Firm* — Osha Bergman Watanabe & Burton LLP

(57) ABSTRACT

An information processing apparatus that detects processing to be executed by a processor includes: a display that displays a status of the processing to be executed by the processor; and a switching controller that switches between a first adjustment mode and a second adjustment mode in association with predetermined processing to be executed without displaying the execution status on the display. The first adjustment mode sets, as a target for selection, a first selection range including a plurality of processing power classes classified according to the magnitude of the processing power. The second adjustment mode sets, as a target for selection, a second selection range in which a first processing power class related to relatively high processing power is excluded from among the first processing power class, a second processing power class, and a third processing power class of the first selection range.

4 Claims, 11 Drawing Sheets

(56) References Cited

U.S. PATENT DOCUMENTS

| | | | |
|---|---|---|---|
| 11,314,547 B1* | 4/2022 | Tang | H04L 67/1097 |
| 2008/0010476 A1* | 1/2008 | Huang | G06F 1/3243 |
| | | | 713/322 |
| 2013/0226364 A1* | 8/2013 | Artman | G06F 1/203 |
| | | | 700/300 |
| 2013/0332760 A1* | 12/2013 | Reece | G06F 1/3296 |
| | | | 713/323 |
| 2014/0173178 A1* | 6/2014 | Schwartz | G06F 12/0246 |
| | | | 711/103 |
| 2014/0173239 A1* | 6/2014 | Schushan | G11C 16/349 |
| | | | 365/185.02 |
| 2015/0059369 A1* | 3/2015 | Prins | F25B 49/02 |
| | | | 62/89 |
| 2016/0132093 A1* | 5/2016 | Maiolani | G05B 15/02 |
| | | | 713/320 |
| 2018/0267582 A1* | 9/2018 | Woo | G05D 13/62 |
| 2018/0321972 A1* | 11/2018 | Lin | G06F 1/329 |
| 2020/0293366 A1* | 9/2020 | Margetts | G06F 9/4881 |

\* cited by examiner

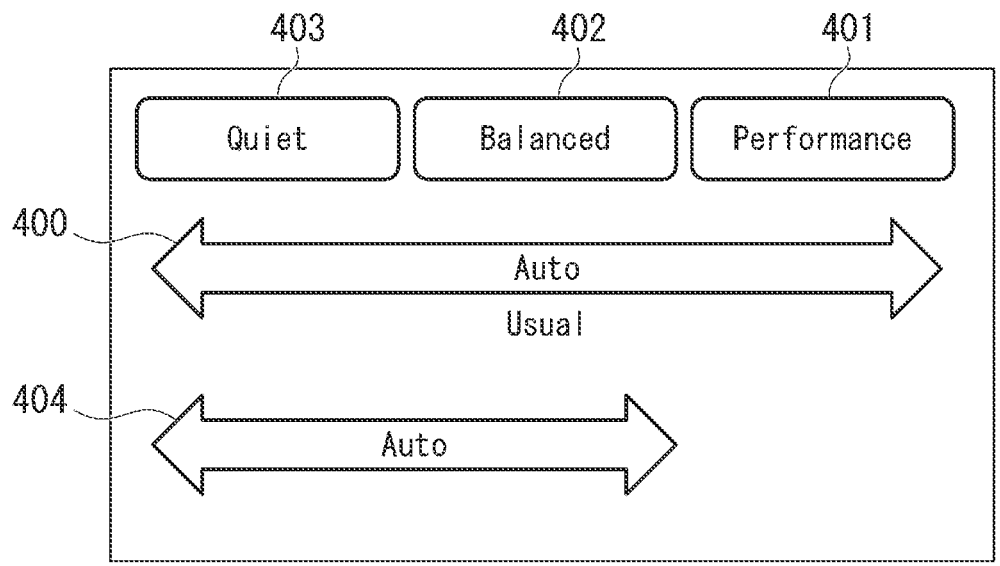
FIG. 6
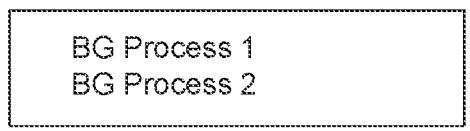
FIG. 7
FIG. 8

DYTC table

| Mode | Classification | Selection Result |
|---|---|---|
| Auto | Without BGT | YES |
| Auto | With BGT | NO |
| Style | — | NO |
| Dock | — | YES |

FIG. 12

DPTF condition table

| Priority | Mode | Condition 2 | Condition 1 | | duration |
|---|---|---|---|---|---|
| 1 | Performance | Without BGT | CPU Power | >=P1 | >=T1 |
| 2 | Balanced | With BGT | CPU Power | >=P2 | >=T2 |
| 3 | Quiet | With BGT | CPU Power | <=P1 | >=T3 |
| 4 | Balanced | With BGT | CPU Power | >=P4 | >=T3 |
| 5 | Dock | With BGT | NA | | |
| NA | Style | Style | NA | | |

FIG. 13

DPTF action table

| Mode | Power limit | Fan table |
|---|---|---|
| Performance | 25W | TAT_A |
| Balanced | 17W | TAT_B |
| Quiet | 9W | TAT_C |
| Style | 10W | TAT_D |
| Dock | 25W | TAT_E |

FIG. 14

INFORMATION PROCESSING APPARATUS AND METHOD

TECHNICAL FIELD

The present invention relates to an information processing apparatus and a method of controlling the throughput of a processor.

BACKGROUND

An information processing apparatus such as a personal computer generates heat according to the operation of a CPU (Central Processing Unit) and the like, and each electronic device itself raises the temperature of the chassis thereof. Such an information processing apparatus may be provided with a temperature sensor for measuring the temperature of a main electronic device or the like, and a cooling fan controlled based on the detection result of the temperature sensor.

Japanese Patent No. 4448101 describes temperature control using a thermal action table and the suppression of a rise in fan speed of a cooling fan when an electronic device such as a CPU is in an idle state.

Processing in the information processing apparatus such as OS update processing, security measure processing, or the like may be executed when a predetermined condition is met regardless of the user operation.

When the information processing apparatus is in a state capable of executing an application program or the like, if such a state is a state where a user leaves the information processing apparatus continuously unoperated for a certain period, the cooling fan may enter a state where the fan speed is slowed down.

Under these circumstances, when a schedule task is executed, the information processing apparatus may suffer from a sudden rise in the chassis temperature thereof and a sudden activation of the cooling fan to suppress the sudden temperature rise.

SUMMARY

One or more embodiments of the present invention suppress heat generation of an information processing apparatus in a state capable of executing an application program but any user operation is interrupted.

According to the first aspect of the present invention, there is provided an information processing apparatus including a processor capable of adjusting processing power to detect processing executed by the processor. This information processing apparatus includes a display unit which displays the status of processing executed by the processor, and a switching control unit (switching controller) which performs control to switch between a first adjustment mode and a second adjustment mode in association with predetermined processing executed without displaying execution status on the display unit, where the first adjustment mode sets, as a target for selection, a first selection range including a plurality of processing power classes classified according to the magnitude of the processing power, and the second adjustment mode sets, as a target for selection, inside of a second selection range in which a first processing power class related to relatively high processing power is excluded from among the first processing power class, a second processing power class, and a third processing power class of the first selection range.

According to the first aspect of the present invention, the above information processing apparatus may be such that a plurality of operating modes defining the operation of the processor is defined according to the magnitude of the processing power, the plurality of operating modes includes: a first operating mode associated with the first processing power class; a second operating mode associated with the second processing power class lower in processing power than the first processing power class; and a third operating mode associated with the third processing power class lower in processing power than the second processing power class, and the switching control unit selects the first adjustment mode to make processing of the processor executable in operating modes including the first operating mode to the third operating mode, or selects the second adjustment mode to make processing of the processor executable in any of operating modes including the second operating mode and the third operating mode.

According to the first aspect of the present invention, the above information processing apparatus may also be such that, when at least either a fact that there is a schedule task to be executed or a state in which a condition for executing a schedule task with a limited throughput is met is detected, the switching control unit makes a determination to switch between the first adjustment mode and the second adjustment mode.

According to the first aspect of the present invention, the above information processing apparatus may further be such that the first operating mode is an operating mode for giving priority to use of processing power of the processor, the third operating mode is an operating mode for giving priority to quietness during processing of the processor, and the second operating mode is an operating mode for balancing both an advantage of the processing power of the processor and an advantage of quietness during processing of the processor.

Further, according to the first aspect of the present invention, the above information processing apparatus may be such that the switching control unit targets, for control of the throughput of the processor, a schedule task in which an execution trigger occurs when the information processing apparatus is in an idle state.

Further, according to the first aspect of the present invention, the above information processing apparatus may be such that the switching control unit switches between the first adjustment mode and the second adjustment mode based on target task information for making a target schedule task identifiable among a plurality of schedule tasks executed by the processor, and execution state information indicative of an execution state of the processor.

Further, according to the first aspect of the present invention, the above information processing apparatus may be such that, when the utilization rate of the processor related to the target schedule task defined in the target task information is less than a predetermined threshold value, the switching control unit does not take the utilization rate as a requirement for switching to the second adjustment mode.

Further, according to the first aspect of the present invention, the above information processing apparatus may be such that the switching control unit detects a state in which a condition for executing the target schedule task, defined in the target task information, with a limited throughput is met, and determines that the condition for executing the target schedule task with the limited throughput is met according to the throughput of a background task executed by the processor.

Further, according to the first aspect of the present invention, the above information processing apparatus may be such that the background task is formed not to generate an information display screen displayed on the display unit.

Further, according to the first aspect of the present invention, the above information processing apparatus may be such that the background task includes a second program related to a first program which displays the information display screen on the display unit but executed independently of the first program.

Further, according to the first aspect of the present invention, the above information processing apparatus may be such that the background task includes a process executed independently of a related application program under an operating condition defined by the application program.

Further, according to the first aspect of the present invention, the above information processing apparatus may be further include a setting unit in which upper limit values of power consumption of the processor corresponding to the second operating mode and the third operating mode are defined, respectively, and which, when either one of the first operating mode and the second operating mode is selected for the processing power of the processor, determines an upper limit value of power consumed by the processor corresponding to the selected operating mode and a drive command value for a cooling fan related to cooling of the processor.

According to the second aspect of the present invention, there is provided a method of controlling the throughput of a processor in an information processing apparatus including the processor capable of adjusting processing power and a display unit which displays the status of processing executed by the processor, including: a step of detecting processing executed by the processor; and a step of performing control to switch between a first adjustment mode and a second adjustment mode in association with predetermined processing executed without displaying execution status on the display unit, where the first adjustment mode sets, as a target for selection, a first selection range including a plurality of processing power classes classified according to magnitude of the processing power, and the second adjustment mode sets, as a target for selection, inside of a second selection range in which a first processing power class related to relatively high processing power is excluded from among the first processing power class, a second processing power class, and a third processing power class of the first selection range.

According to the second aspect of the present invention, the above method may also include: a step of specifying a specified value based on an indicator related to the throughput of the processor; and a step of adjusting an upper limit of the throughput of the processor based on the specified value and the detection result.

According to the second aspect of the present invention, the above method may also be such that the step of detecting processing executed by the processor includes a step detecting at least either the fact that there is a schedule task to be executed or a state in which a condition for executing a schedule task with a limited throughput is met.

According to the second aspect of the present invention, the above method may further be such that the step of detecting processing executed by the processor includes a step of determining that a condition for executing a schedule task with a limited throughput is met according to the throughput of a background task executed by the processor.

Further, according to the second aspect of the present invention, the above method may be such that the step of detecting processing executed by the processor includes a step of determining that a condition for executing a schedule task with a limited throughput is met when a background task with throughput exceeding a predetermined ratio to the throughput of the processor is included in tasks executed by the processor.

Further, according to the second aspect of the present invention, the above method may be such that the background task includes a task by an update processing program for updating software included in an OS, or a task of a background process which launches software to verify information security.

The above-described aspects of the present invention can suppress the heat generation of the information processing apparatus in a state capable of executing an application program but any user operation is interrupted.

BRIEF DESCRIPTION OF THE DRAWINGS

FIG. 6 is a diagram for describing operating mode control of the laptop PC 1.

FIG. 7 is a diagram for describing tasks in an executable state and a classification thereof.

FIG. 8 is a diagram for describing a background task list.

FIG. 12 is a diagram for describing information related to electric power control of the second embodiment.

FIG. 13 is a diagram for describing information related to electric power control of the second embodiment.

FIG. 14 is a diagram for describing information related to electric power control of the second embodiment.

DETAILED DESCRIPTION

[Terminology]

Figure 1A:
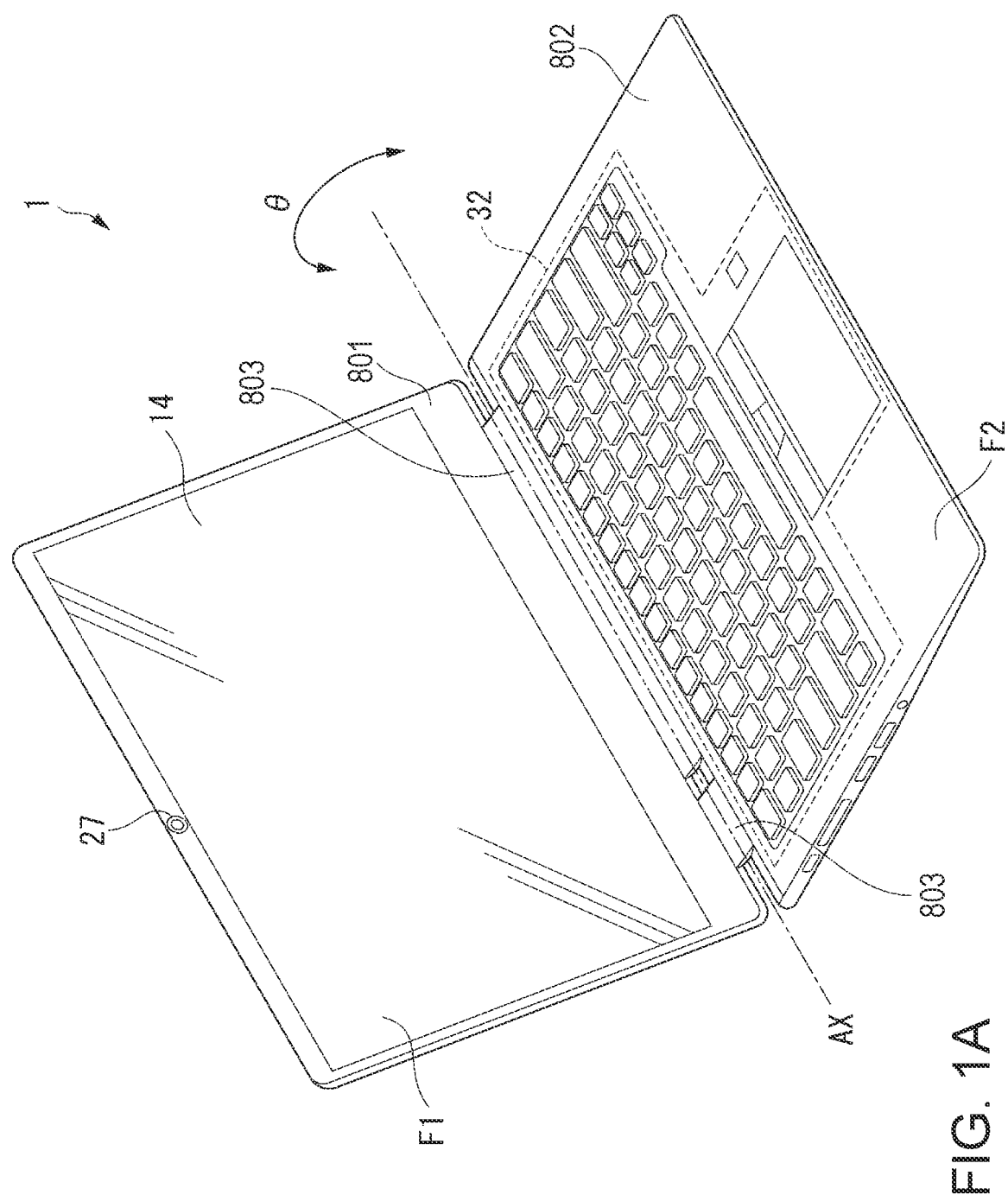
FIG. 1A is an external view illustrating an example of a laptop PC 1.

Terms used in this specification will be described. The term "schedule task" in embodiments means a program to be generally executed when a series of conditions (trigger conditions) is met. A main component which sets the trigger conditions is called an owner of the trigger conditions. The trigger conditions may be registered in a schedule function of an OS (operating system). In this case, the OS monitors the trigger conditions registered in the schedule function as the owner of the trigger conditions to execute a schedule task.

Any program other than the OS may also become the owner of trigger conditions. The program monitors uniquely set trigger conditions, and executes a "schedule task" when the trigger conditions are met. There are two types of trigger conditions, i.e., an event-based type and a time-based type. In the embodiments, the trigger conditions include the detection of a state of a relatively low utilization rate of a CPU (Central Processing Unit), start of security measure processing, and the like. Event-based schedule tasks to be executed according to the satisfaction of the trigger conditions will be described.

On the other hand, the term "general task" means any program other than the schedule task. The program includes a so-called application program.

An idle state is an example of an operating state in which the utilization rate of the CPU is relatively low. For example, an information processing apparatus makes a transition to the idle state when predetermined conditions defined based on the state of a relatively low utilization rate of the CPU, the duration of the state, the presence or absence of access to an HDD, the presence or absence of the detection of an operation by a user (user activity), and the like are met.

For example, when the percentage of a user mode time of an idle process is denoted by Ui, the percentage of a kernel mode time of the idle process is denoted by Ki, and the elapsed time is denoted by Et, the utilization rate Y of the CPU can be calculated by the following equation:

$$Y=(1-(Ui+Ki)/Et)\times 100\%$$

As expressed in the above equation, the utilization rate of the CPU in the idle state becomes close to 0%.

A task start state is a state immediately after the start of execution of a schedule task due to the satisfaction of trigger conditions and before the fan speed of a cooling fan increases. The user activity means input on an input device (HID), such as a keyboard, a pointing device, and a touch screen, the execution of a program instructed by the user, playback of streaming data, or the like. In such a situation that there is any user activity, it may be determined that the user is using the information processing apparatus in front of the information processing apparatus.

A "background task" in the embodiments is an example of the above-mentioned schedule task. The "background task" does not include any process of an application program executed according to the user activity. On the other hand, a "foreground task" includes a process of an application program executed according to the user activity. The "foreground task" is an example of the general task.

For example, in the case of a Microsoft (registered trademark) OS, tasks executed by the CPU can be divided roughly into a task by the above-mentioned "application program," a task executed by the OS (which is called a "Windows (registered trademark) process"), and a task other than the above-mentioned tasks. For example, the task by the "application program" is formed to start processing for generating an information display screen (visible window) displayed on a display unit.

It is better to classify the task by the above-mentioned "application program" as the "foreground task" from the OS identification result. On the other hand, it is better to classify any task other than the "foreground task" as the "background task."

From a perspective different from the above, "background tasks" will be organized below.

For example, a background task may include a second program related to a first program for displaying the information display screen on the display unit and executed independently of the first program.

The background task may also include a process executed independently of a related application program under operating conditions defined by the application program.

More specifically, the background task may include a task by an update processing program for updating software included in the OS, or a task of a background process to launch software for verifying information security.

The term "processing power class" in the embodiments means each of plural stages into which the CPU processing power allowed for the execution of the CPU when the CPU executes a program is divided.

[Information Processing Apparatus]

FIG. 1A is an external view illustrating an example of a laptop PC 1 as the information processing apparatus in the embodiments. In the embodiments, the laptop PC 1 as the example of the information processing apparatus will be described.

The laptop PC 1 includes a first chassis 801, a second chassis 802, and a hinge mechanism 803.

The first chassis 801 is a chassis including a display unit 14 and a camera 27, and connected to the second chassis 802 by the hinge mechanism 803. The display unit 14 is placed on the first chassis 801 in such a manner that a display surface F1 of the display unit 14 is visible. Further, the camera 27 is arranged on the same surface of the first chassis 801 as the display surface F1 of the display unit 14.

The second chassis 802 is a chassis having at least an input unit 32 such as a keyboard, and connected to the first chassis 801 by the hinge mechanism 803. The input unit 32 is arranged on a surface F2 of the second chassis 802, and a motherboard with main hardware of the laptop PC 1 mounted thereon is housed inside the chassis.

The hinge mechanism 803 (an example of a rotation mechanism) couples the first chassis 801 and the second chassis 802 in such a manner that the first chassis 801 is rotatable around a rotation axis AX relative to the second chassis 802.

In the following description, an angle between the surface (display surface F1) of the first chassis 801 and the surface F2 of the second chassis 802 is called an opening/closing angle θ. The hinge mechanism 803 can rotate the first chassis 801 in a range of opening/closing angles θ from 0° to 360°, and can maintain any opening/closing angle θ even when some torque is applied.

According to this structure, the laptop PC 1 can change a usage mode (usage form) according to the opening/closing angle θ. For example, when the opening/closing angle θ is 0°, the laptop PC 1 is in a closed mode, while when the opening/closing angle θ is 360°, the laptop PC 1 is in a tablet mode. Further, for example, when the opening/closing angle θ is larger than 0° and smaller than 190° (in the case of 0°<θ<190°), the laptop PC 1 is in a laptop mode, while when the opening/closing angle θ is equal to or larger than 190° and smaller than 360° (in the case of 190°<θ<360°), the laptop PC 1 is in a style mode. Note that such a form as to use the laptop PC 1 mounted on an unillustrated docking station in the same state of the opening/closing angle θ as that in the above tablet mode may be called a dock mode.

Here, in the example illustrated in FIG. 1A, the mode of the laptop PC 1 corresponds to the laptop mode in which the opening/closing angle θ is larger than 0° and smaller than 190°. In the laptop mode, an auto mode to adjust the processing performance automatically to be described later is applied. On the other hand, in the style mode and the dock mode, the auto mode is not applied.

Figure 1B:
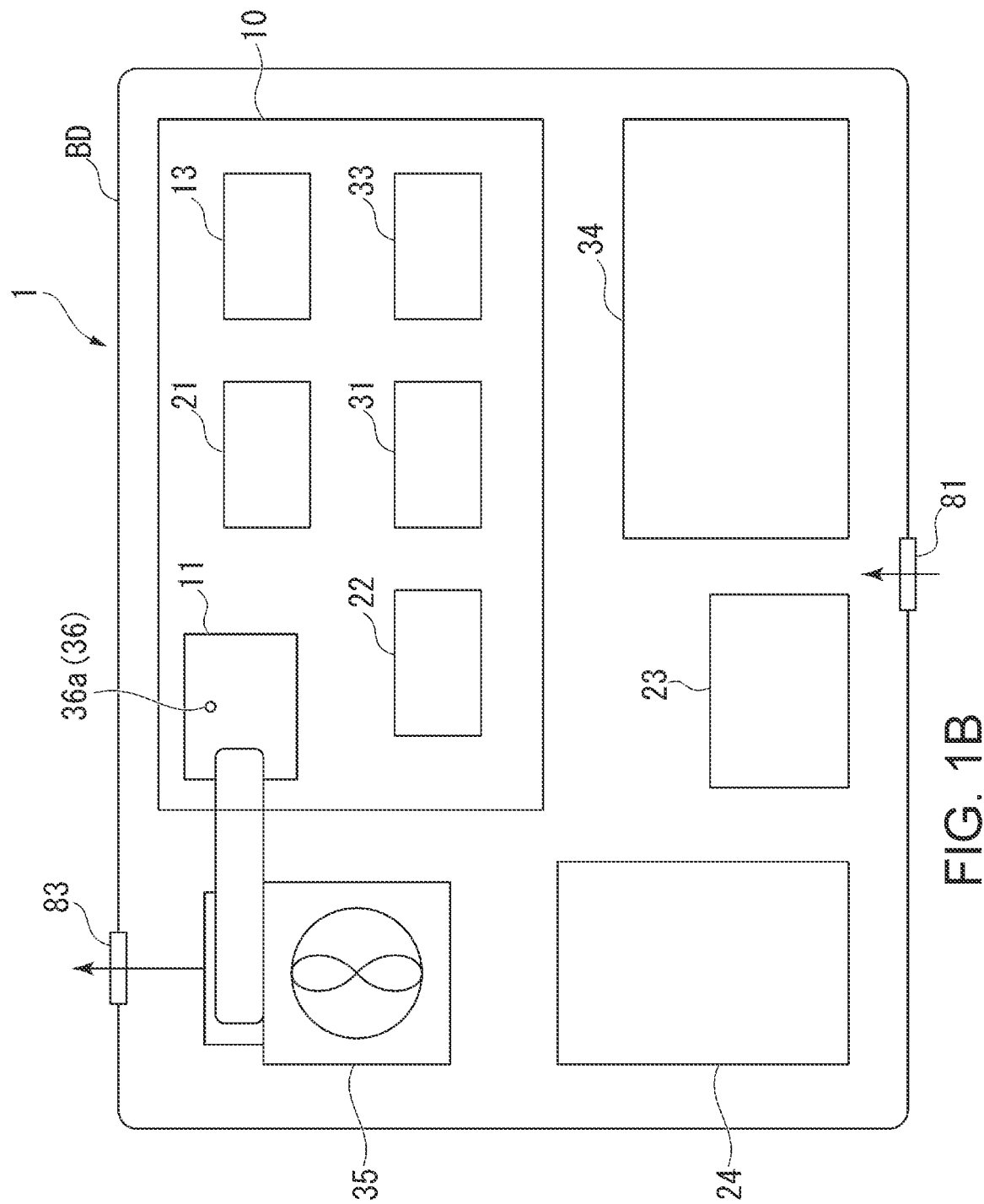
FIG. 1B is a schematic plan view inside a chassis of the laptop PC 1.

FIG. 1B is a plan view schematically illustrating the inside of the second chassis 802 of the laptop PC 1. In the following description, the second chassis 802 is simply called a chassis BD, and the laptop PC 1 with a cooling fan 35 mounted therein is illustrated. However, the present invention is not limited thereto, and the embodiment can also be applied to a case of suppressing a sudden rise in the chassis temperature of an information processing apparatus without the cooling fan 35 mounted therein.

A motherboard 10, an HDD 23, an audio system 24, a battery 34, and the cooling fan 35 are arranged inside the chassis BD. On the motherboard 10, for example, a CPU 11, a video subsystem 13, a chipset 21, a BIOS memory 22, an embedded controller 31, and a power supply circuit 33 are mounted.

The cooling fan 35 replaces air inside the chassis BD with outside air. For example, when the cooling fan 35 is operated, the outside air enters the inside of the chassis BD through an air inlet 81 of the chassis BD, and the air is heat-exchanged through a heatsink (not illustrated) and exhausted outside of the chassis BD from an air outlet 83. The heatsink is thermally coupled to the CPU 11 through a heat pipe (not illustrated) or the like. Inside the chassis BD, electronic devices required to manage temperature and plural temperature sensors 36 are arranged at predetermined positions. For example, a temperature sensor 36a detects the temperature of the CPU 11. Each of unillustrated temperature sensors 36b to 36e also detects temperature in a position where the temperature sensor is placed.

The CPU 11 may be a CPU and a GPU, or either one of them. The CPU 11 may also be such a type as to form the CPU and the GPU as the same core. Further, the CPU 11 may be such a type as to form the CPU and the GPU as different cores and to share the load therebetween. Further, the number of CPUs 11 may be plural.

As an example, the CPU 11 supports speed step technology and throttling technology. The speed step is a technique for adjusting the operating voltage and the operating frequency of a processor by setting values thereof. For example, in the speed step, the operating frequency at which the processor actually operates can be reduced step by step by setting the maximum operating frequency allowed depending on the system state.

At the same time when the operating frequency is reduced, the operating voltage is reduced up to a value required for the CPU 11 to operate at the operating frequency. For example, when executing the speed step, the CPU 11 gives an instruction to the embedded controller 31 to cause the power supply circuit 33 to change the voltage of the CPU 11 to a voltage that matches the set maximum operating frequency. The power consumption and the amount of heat generation of the CPU 11 are reduced by the speed step.

The throttling is a function to cause the CPU 11 to perform intermittent operation in which the CPU 11 starts and stops the operation at regular intervals in order to switch the average processing speed. In order to execute the throttling, system firmware sets, in a register of the processor, the validity/invalidity of the throttling and a duty ratio (throttling rate). Both the speed step and the throttling can change the processing power and the amount of heat generation of the processor step by step.

Further, the speed step and the throttling can be combined to move to the throttling while maintaining the lowest operating frequency by the speed step. In the embodiment, these techniques are used to change the processing power of the processor into plural stages in order to adjust the amount of heat generation. Hereinafter, it is assumed that a command value for the processing power of the processor changing by both or either one of the speed step and the throttling is indicated by a discrete value and that a value of each stage is called a performance step. When the performance step is 100%, the state is a normal state in which the processing power does not decrease. The command value for the processing power of the processor may also be called a power adjustment value (power slider position).

Note that, among CPUs, there is a CPU having a function to monitor core temperature and perform control to suppress the temperature by reducing the operating frequency and operating voltage or performing intermittent operation when the load increases to increase the temperature. As an example of such a technique, Intel (registered trademark), Inc. provides a CPU with a temperature monitoring control function incorporated in a TCC (Thermal Control Circuit). The CPU 11 may also include the TCC.

As the performance step increases and the utilization rate increases, the power consumption of the CPU 11 increases and the amount of heat generation increases as well. When the processing power is reduced, the CPU 11 sets power consumption corresponding to the set performance step as the maximum to operate with power consumption according to the load. Therefore, the time to execute a certain process becomes longer as the performance step decreases. Heat generated by the CPU 11 not only increases the temperature of the CPU 11 itself, but also increases the internal temperature of the chassis BD.

Figure 2:
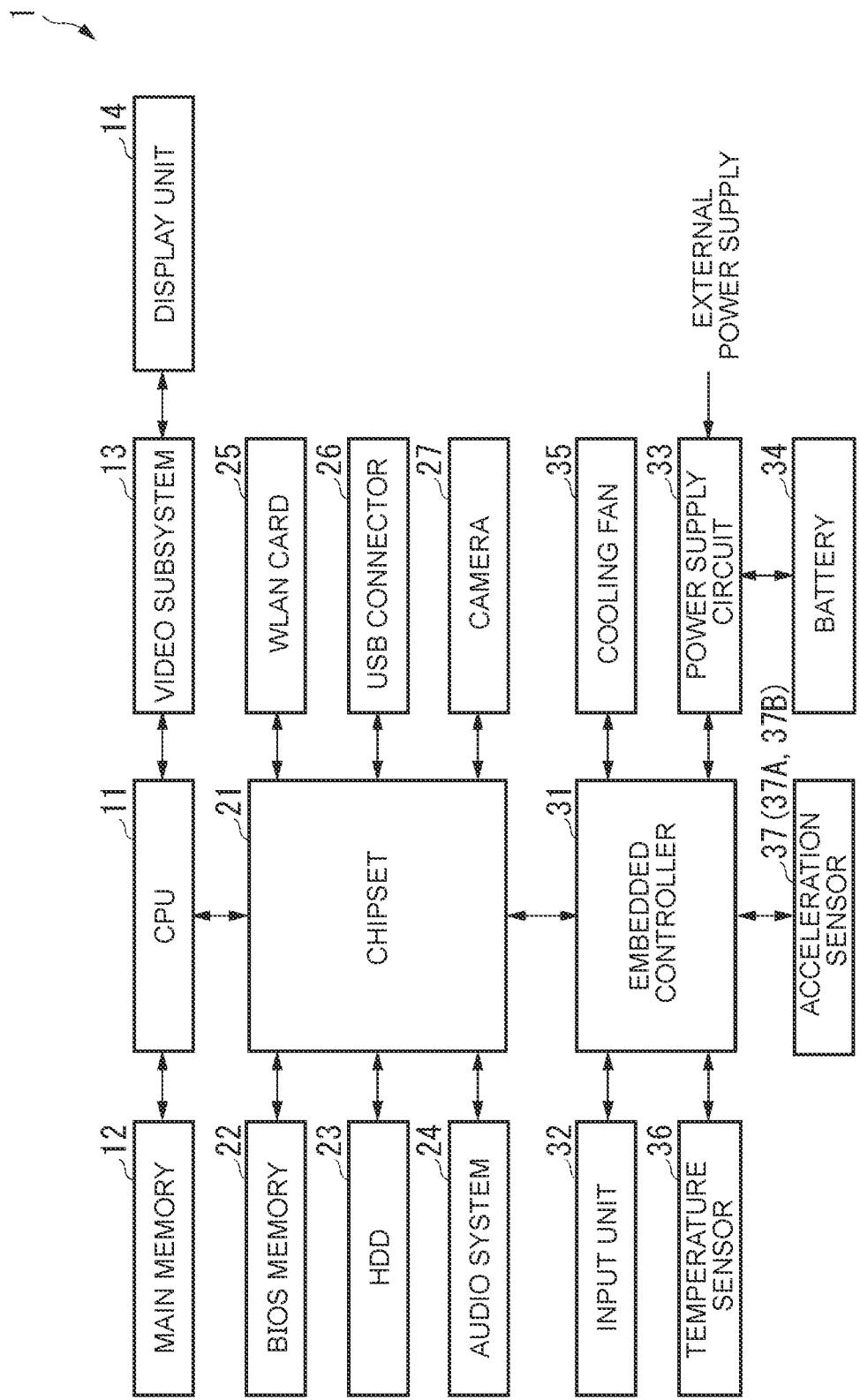
FIG. 2 is a diagram illustrating an example of the main hardware configuration of the laptop PC 1.

Referring next to FIG. 2, the main hardware configuration of the laptop PC 1 will be described.

FIG. 2 is a diagram illustrating an example of the main hardware configuration of the laptop PC 1.

The laptop PC 1 includes the CPU 11, a main memory 12, the video subsystem 13, the display unit 14, the chipset 21, the BIOS memory 22, the HDD 23, the audio system 24, a WLAN card 25, a USB connector 26, the camera 27, the embedded controller 31, the input unit 32, the power supply circuit 33, the battery 34, the cooling fan 35, the temperature sensors 36, and an acceleration sensor 37.

The CPU 11 executes various arithmetic processing by program control to control the entire laptop PC 1.

The main memory 12 is a writable memory used as reading areas of execution programs of the CPU 11 or working areas to which processing data of the execution programs are written. The main memory 12 is configured, for example, to include plural DRAM (Dynamic Random Access Memory) chips. The execution programs include an OS, various drivers for hardware-operating peripheral devices, various services/utilities, application programs, and the like.

The video subsystem 13 is a subsystem to implement functions related to image display. The video subsystem 13 includes a video controller. This video controller processes a drawing command from the CPU 11, and writes processed drawing information to a video memory and reads this drawing information from the video memory to output the drawing information to the display unit 14 as drawing data (display data).

The display unit 14 is, for example, a liquid crystal display to display a display screen based on the drawing data (display data) output from the video subsystem 13. The display unit 14 is placed on the first chassis 801 in such a manner that the display surface F1 is visible.

The chipset 21 includes controllers, such as a USB (Universal Serial Bus), a serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset 21. For example, the plural devices include the BIOS memory 22, the HDD 23, the audio system 24, the WLAN card 25, the USB connector 26, the camera 27, and the embedded controller 31 to be described later.

The BIOS (Basic Input Output System) memory 22 is configured, for example, by an electrically rewritable non-volatile memory such as an EEPROM (Electrically Erasable Programmable Read Only Memory) or a flash ROM. The BIOS memory 22 stores the BIOS and system firmware for controlling the embedded controller 31 and the like.

The HDD (Hard Disk Drive) 23 (an example of a non-volatile storage device) stores the OS, various drivers, various services/utilities, application programs, and various data.

A microphone and a speak, not illustrated, are connected to the audio system 24, which records, plays back, and outputs sound data. As an example, it is assumed that the microphone and the speaker are incorporated in the laptop PC 1.

The WLAN (Wireless Local Area Network) card 25 is connected to a network by a wireless LAN to perform data communication. For example, when receiving data from the network, the WLAN card 25 generates an event trigger indicating that the data is received.

The USB connector 26 is a connector to connect peripheral devices using the USB.

The input unit 32 is, for example, an input device having a keyboard and a pointing device such as a touchpad. As illustrated in FIG. 1A, the input unit 32 is placed on the surface F2 of the second chassis 802.

The power supply circuit 33 includes, for example, a DC/DC converter, a charge/discharge unit, an AC/DC adapter, and the like to convert DC voltage supplied from an external power supply or the battery 34 into plural voltages required to operate the laptop PC 1. Further, the power supply circuit 33 supplies power to each unit of the laptop PC 1 under the control of the embedded controller 31.

The battery 34 is, for example, a lithium battery, which is charged through the power supply circuit 33 when power is supplied from the external power supply to the laptop PC 1, and outputs the charged power through the power supply circuit 33 as operating power of the laptop PC 1 when power is not supplied from the external power supply to the laptop PC 1.

The acceleration sensor 37 is, for example, a three-axis acceleration sensor to detect acceleration. Note that the laptop PC 1 includes two acceleration sensors 37 (37A, 37B), and the detection results of the two acceleration sensors 37 (37A, 37B) are used to detect the opening/closing angle θ between a first chassis BD1 and a second chassis BD2, not illustrated. The acceleration sensor 37A is, for example, arranged inside the first chassis BD1, and the acceleration sensor 37B is, for example, arranged inside the second chassis BD2.

The embedded controller 31 is a one-chip microcomputer which monitors and controls various devices (peripheral devices, sensors, and the like) regardless of the system state of the laptop PC 1. The embedded controller 31 includes a CPU, a ROM, a RAM, multi-channel A/D input terminal and D/A output terminal, a timer, and digital input/output terminals, which are not illustrated. To the digital input/output terminals of the embedded controller 31, for example, the input unit 32, the power supply circuit 33, the cooling fan 35, the temperature sensor 36, the acceleration sensor 37, and the like are connected, and the embedded controller 31 controls the operation of them.

The embedded controller 31 has a power management function to control the power supply circuit 33. The power management function may conform to the ACPI (Advanced Configuration and Power Interface) specifications. The embedded controller 31 controls the power supply circuit 33 according to predetermined operating modes of the laptop PC 1 to control a value of drive power supplied, for example, to the CPU 11. The above-mentioned predetermined operating modes include, for example, an auto mode 400, a fixed mode 410, and a power-saving mode 420. In response to an event trigger, the operating mode of the laptop PC 1 makes a transition to any one of the auto mode 400, the fixed mode 410, and the power-saving mode 420. Note that the operating modes of the laptop PC 1 may be operating modes defined in the ACPI (Advanced Configuration and Power Interface) specifications. The details of each operating mode will be described later with reference to FIG. 5 and FIG. 6.

Figure 3:
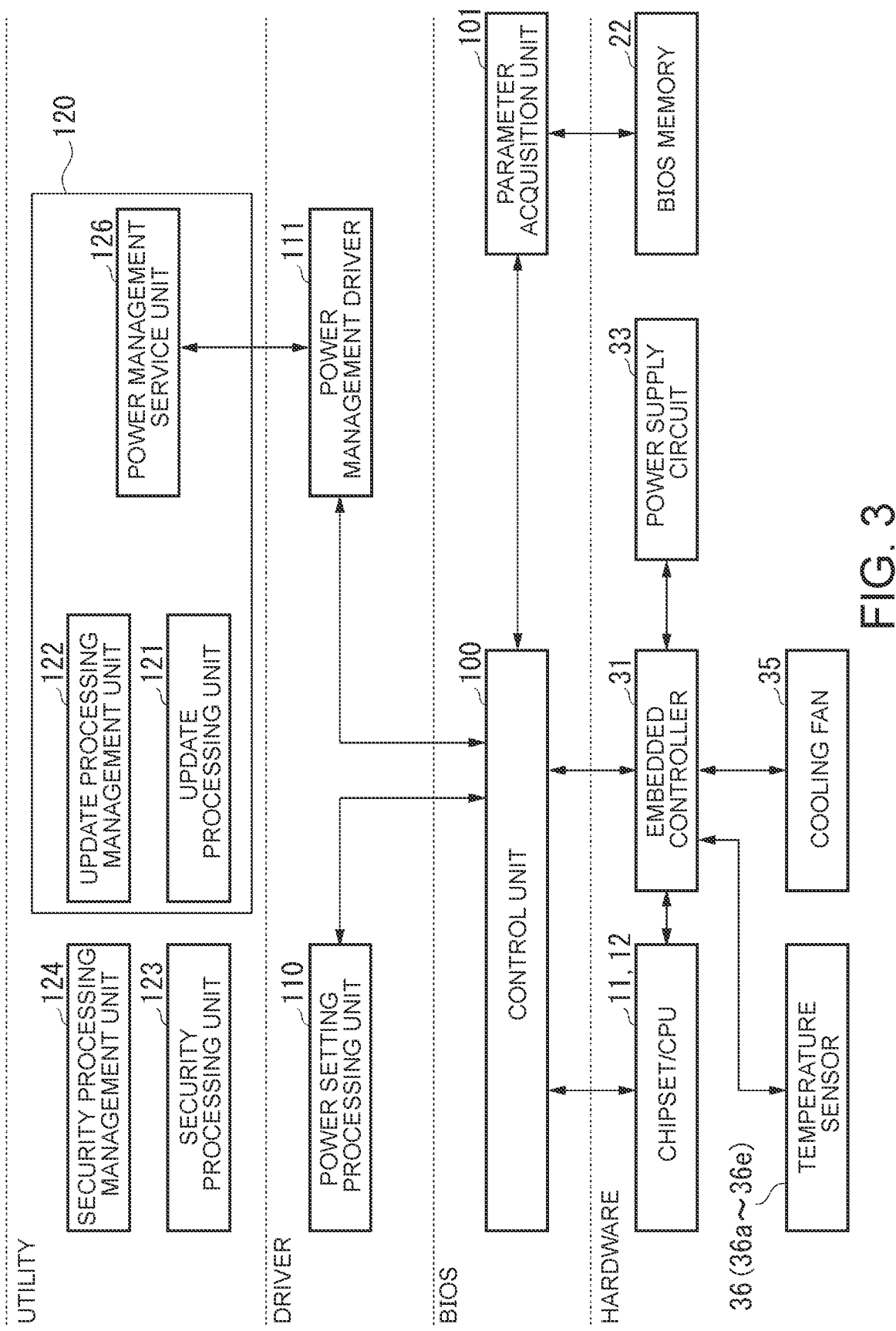
FIG. 3 is a block diagram illustrating an example of the functional configuration of the laptop PC 1.

FIG. 3 is a block diagram illustrating an example of the functional configuration of the laptop PC 1. The laptop PC 1 includes, for example, a control unit 100, a parameter acquisition unit 101, a power setting processing unit 110 (setting unit), a power management driver 111 (switching control unit), an update processing unit 121, an update processing management unit 122, a security processing unit 123, a security processing management unit 124, and a power management service unit 126. The control unit 100, the parameter acquisition unit 101, the power setting processing unit 110, the power management driver 111, the update processing unit 121, the update processing management unit 122, the security processing unit 123, the security processing management unit 124, and the power management service unit 126 are implemented, for example, by the processor such as the CPU 11 executing a program(s) stored in the HDD 23 or the main memory 12. Further, these components may also be realized by hardware (circuit unit; circuitry) such as LSI (Large Scale Integration) or ASCI (Application Specific Integrated Circuit), or FPGA (Field-Programmable Gate Array), or realized in cooperation of software and hardware.

Further, in FIG. 3, the services/utilities, the drivers, and the BIOS are realized, for example, by the CPU 11 reading programs stored in the HDD 23 or the BIOS memory 22 into the main memory 12 and executing the programs. Here, the update processing unit 121, the update processing management unit 122, the security processing unit 123, the security processing management unit 124, and the power management service unit 126 correspond to the services/utilities, the power setting processing unit 110 and the power management driver 111 correspond to the drivers, and the control unit 100 and the parameter acquisition unit 101 correspond to the BIOS. Note that the update processing unit 121, the update processing management unit 122, and the power management service unit 126 may be provided as part of an OS 120. Likewise, the security processing unit 123 and the security processing management unit 124 may also be provided as part of the OS 120.

The update processing unit 121 executes processing (update processing) for updating software on the laptop PC 1. More specifically, the update processing unit 121 executes an update processing program for updating software included at least in the OS. The processing by the update processing unit 121 is an example of a background task to be described later. The update processing management unit 122 executes processing for making various settings to cause the update processing unit 121 to perform the update processing. The processing by the update processing management unit 122 is an example of a foreground task to be described later.

The security processing unit 123 executes processing for checking security on the laptop PC 1, and processing related to the security based on the checking result. More specifically, the security processing unit 123 executes software for verifying information security. Along with the execution of the above software, a background process is started. The processing by the security processing unit 123 is an example of the background task to be described later. The security processing management unit 124 executes processing for making various settings to cause the security processing unit 123 to perform the above-mentioned processing. The processing by the security processing management unit 124 is an example of the foreground task to be described later.

The power management service unit 126 provides a service for power management (management of power consumption). For example, the power management service unit 126 outputs, to the power management driver 111, an instruction to change the operating mode according to the event trigger to change the operating mode.

The power management driver 111 is, for example, a driver according to the ACPI specifications. The power management driver 111 manages the power consumption of the laptop PC 1 under the control of the power management service unit 126. For example, the power management driver 111 controls the control unit 100 in response to accepting an operating mode changing instruction from the power management service unit 126.

For example, the power management driver 111 monitors an idle process generated when the OS 120 is in the idle state. The idle process is assigned with high priority over other processes. Therefore, when the laptop PC 1 enters the idle state, the idle process is executed before the execution of any schedule task.

The power management driver 111 can hook the idle process. The power management service unit 126 can recognize that the system of the laptop PC 1 makes a transition to the idle state from the idle process hooked by the power management driver 111. In this case, the idle state recognized by the power setting processing unit 110 matches the idle state recognized by the OS 120 as the owner of the trigger condition. The power setting processing unit 110 can acquire the utilization rate of the CPU 11 from the OS 120 or the processor.

The control unit 100 conforms, for example, to DYTC (Dynamic Thermal Control ACPI I/F method). The control unit 100 controls the embedded controller 31. Further, the control unit 100 instructs the power setting processing unit 110 to change the upper limit of the power consumption of the CPU 11. The upper limit of the power consumption is, for example, a settable power consumption level called a "Power Limit," that is, the upper limit of power consumption capable of being consumed by the CPU 11 per unit time. The control unit 100 instructs the embedded controller 31 to change the amount of power to be supplied from the power supply circuit 33 to the CPU 11.

For example, the control unit 100 instructs the embedded controller 31 to change the fan speed of the cooling fan 35. Note that the control unit 100 may also control the drive volume itself instead of the fan speed.

The power setting processing unit 110 is, for example, a DPTF (Dynamic Platform and Thermal Framework) driver. The power setting processing unit 110 sets the upper limit of the power consumption of the CPU 11 based on a control state of the control unit 100. For example, based on an instruction from the control unit 100, the power setting processing unit 110 changes the setting of the upper limit of the power consumption of the CPU 11.

For example, the power setting processing unit 110 can further define its own idle state by using parameters such as the average utilization rate of the CPU 11 during a predetermined monitoring time, the presence or absence of a user activity, and a disk access time. As an example, when the fact that utilization rate after a predetermined elapsed time since the last user activity is almost 0% is detected, the power setting processing unit 110 can recognize the idle state. Thus, the power setting processing unit 110 can recognize the idle state defined by itself to reduce the processing power of the CPU 11 before the idle state defined by the owner of the trigger condition is established to execute schedule tasks.

The update processing unit 121 and the security processing unit 123 as BG tasks are an example of processing units for executing processing classified in the above-mentioned schedule tasks.

When a general task is executed in the idle state, since the priority of the process is high, any idle process is deprived of the right to use the CPU 11. The power setting processing unit 110 can monitor this state to recognize the end of the idle state or the start of execution of the general task at the time of the idle state. The power setting processing unit 110 can recognize a task start state and the end of execution of the schedule tasks based on the utilization rate of the CPU 11, the temperature measured by the temperature sensor 36a, and the like.

[Operation of Temperature Control System]

The embedded controller 31 controls the fan speed of the cooling fan 35 in a step-by-step manner.

Figures 4, 5:
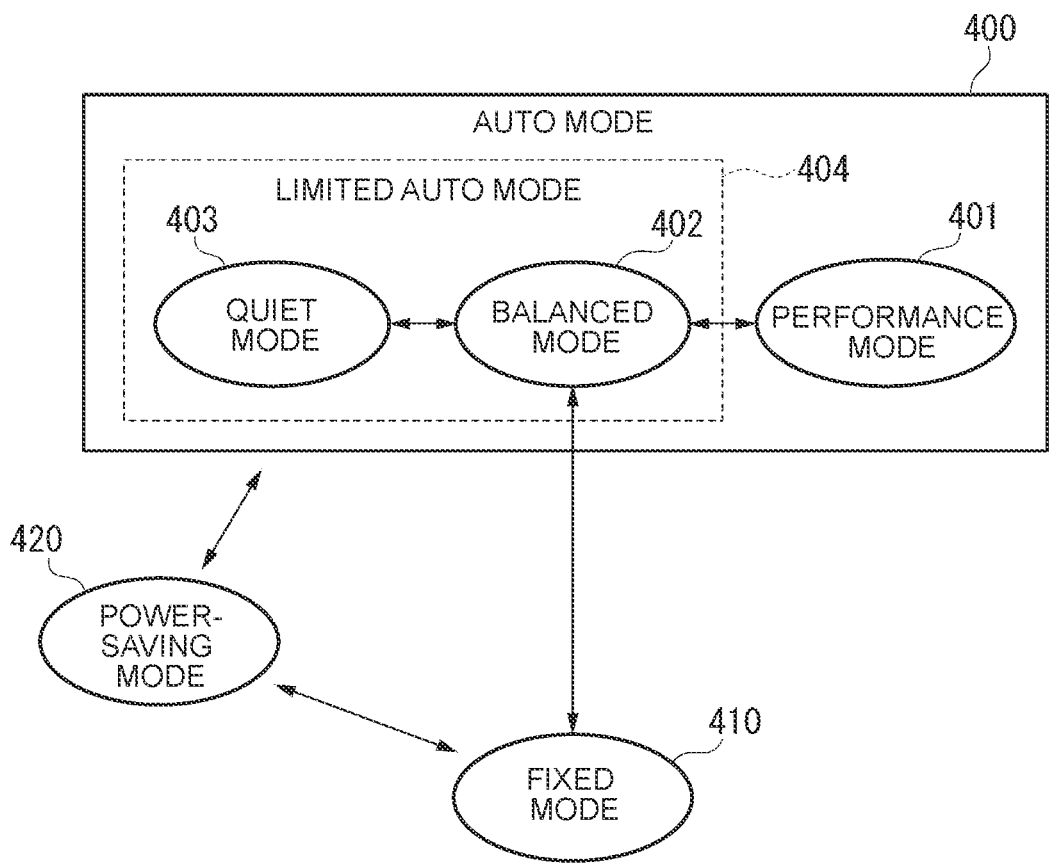
FIG. 4 is a diagram for describing a temperature control data table (TAT) used for temperature control.
FIG. 5 is a state transition diagram of operating modes of the laptop PC 1.

Referring to FIG. 4, temperature control by the embedded controller 31 will be described. FIG. 4 is a diagram for describing a temperature control data table (TAT) used for temperature control. This temperature control data table includes an item of Temperature Sensor and an item of Set Temperature. For example, in this temperature control data table, data on set temperatures changed among four-stage speed steps of the cooling fan 35, i.e., stop of the operating state, low-speed rotation, medium-speed rotation, and high-speed rotation, are stored for each of the temperature sensors 36a to 36e. The set temperatures are composed of enabled temperatures LTe, MTe, HTe and disabled temperatures LTd, MTd, HTd for each operating state, and each piece of data is set to form hysteresis characteristics between a case where the rotational speed changes in an increasing direction and a case where the rotational speed changes in a lowering direction.

The enabled temperatures LTe, MTe, HTe are temperatures each of which moves to the speed step concerned from a one-step slower speed step when the measured temperature of the temperature sensor tends to rise. The disabled temperature LTd, MTd, HTd are temperatures each of which moves to a one-step slower speed step from the speed step concerned when the measured temperature of the temperature sensor tends to drop. Here, a speed step slower than the above-mentioned low-speed rotation is a stopped state.

The set temperatures, which are set corresponding to each of the temperature sensors 36a to 36e, are set to operate the cooling fan 35 at a rotational speed as low as possible so that the surface temperature in a predetermined place of the chassis BD does not exceed a predetermined value, or to operate the cooling fan 35 at an appropriate rotational speed so that the temperature of each electronic device does not exceed a critical temperature.

When the measured temperature of any one of the temperature sensors 36a to 36e reaches each of the enabled temperatures LTe, MTe, HTe, the embedded controller 31 increases the rotational speed of the cooling fan 35 by one step. When the measured temperatures of all of the temperature sensors 36a to 36e drop up to less than the disabled temperatures MTd and HTd, the embedded controller 31 decreases the rotational speed of the cooling fan 35 by one step. Then, when the measured temperatures become less than the disabled temperature LTd, the embedded controller 31 stops the cooling fan 35.

The embedded controller 31 controls the rotational speed of the cooling fan 35 based on the measured temperatures of the temperature sensors 36a to 36e and the temperature control data table. However, as the rotational speed of the cooling fan 35 increases, the fricative sound of air passing through the air outlet 83 becomes larger.

For example, when the temperature of the CPU 11 rises, the rotational speed of the cooling fan 35 increases along therewith, and noise may be generated. In the embodiment, one or more temperature control data tables, each of which defines numerical values suitable for each operating mode on this temperature control data table, are used. Tables with reference signs TAT_A to TAT_E assigned thereto are an example of temperature control data tables on which numerical values different from one another are defined. In operating mode control to be described below, these temperature control data tables are used to perform control not to make the noise loud.

[Operating Mode Control]

Referring to FIG. 5 and FIG. 6, control of the operating mode (operating mode control) of the laptop PC 1 in the embodiment will be described. FIG. 5 is a state transition diagram of the operating modes of the laptop PC 1. FIG. 6 is a diagram for describing the operating mode control of the laptop PC 1.

The operating modes of the laptop PC 1 include the auto mode 400, the fixed mode 410, and the power-saving mode 420 as operating modes related to the performance of the CPU 11. In the performance control of the CPU 11, for example, the operating mode of the laptop PC 1 makes a transition to any one of the auto mode 400, the fixed mode 410, and the power-saving mode 420.

In the auto mode 400, the upper limit of the performance of the CPU 11 is automatically adjusted. The auto mode 400 is an operating mode selectable in the most general usage pattern as the laptop PC 1. For example, the auto mode 400 enables the most active operation.

On the other hand, in the fixed mode 410, the upper limit of the performance of the CPU 11 is fixed.

The power-saving mode 420 is an operating mode to operate the CPU 11 with a value of power consumption lower than the auto mode 400 and the fixed mode 410. For example, the power-saving mode 420 operates the CPU 11 with low power consumption to make the CPU 11 stand by in a state returnable quickly to any one of the auto mode 400 and the fixed mode 410 that provide the normal operating state. A so-called Modern Standby mode is an example of the power-saving mode 420. In the Modern Standby mode, it is controlled to a state where the display of the display unit 14 is turned off (stopped). Note that the power-saving mode 420 may also be a shutdown state in which power supply is turned off by software (power shutdown state), or a hibernation state as a hibernating state in which the work contents are saved to the HDD 23 or the like.

The user sets automatic or manual selection of an operating mode of the power setting processing unit 110 through the input unit 32. When the manual selection is set, the power setting processing unit 110 operates only in the set operating mode. When the automatic selection is set, the power setting processing unit 110 selects an operating mode based on vibration acquired from the acceleration sensor 37, the attitude of the chassis BD, and the like, and makes a transition among a performance mode 401 to a quiet mode 403.

When the user's operation is suspended continuously for a predetermined time while the laptop PC 1 is being controlled in either the auto mode 400 or the fixed mode 410 mentioned above, the laptop PC 1 is put into the idle mode. In this idle mode, the laptop PC 1 becomes a state where the display of the display unit 14 is turned on and the execution of background processing by the CPU 11 and the like are allowed.

A more specific example of the auto mode 400 will be described. The above-mentioned auto mode 400 includes, for example, three operating modes, i.e., the quiet mode 403, the performance mode 401, and a balanced mode 402. When the operating mode of the laptop PC 1 is in the auto mode 400, a transition to any one of the quiet mode 403, the performance mode 401, and the balanced mode 402 is made.

Since the quiet mode 403 gives priority to quietness over processing performance, the quiet mode 403 corresponds to an operating mode to lower the performance step before increasing the rotational speed of the cooling fan 35 when the temperature rises.

Here, the suppression of the rotational speed of the cooling fan 35 means either one or more of a way of reducing the amount of heat generation of the CPU 11 not to rotate the stopped cooling fan 35, a way of stopping the rotating cooling fan 35, and a way of suppressing the rotational speed of the cooling fan 35 rotating at a high rotational speed to such an extent that noise is not an issue to rotate the cooling fan 35 at the suppressed rotational speed.

In the case of control in the quiet mode 403, for example, it is better for the power setting processing unit 110 to lower the performance step to such an extent that the cooling fan 35 does not rotate even when the utilization rate of the CPU 11 is 100%. Alternatively, in the above case, the power setting processing unit 110 can lower the performance step not to increase the rotational speed of the cooling fan 35 up to a rotational speed at which noise is an issue even when the utilization rate of the processor is 100%. For the CPU 11 controlled in the quiet mode 403, power consumption corresponding to the set performance step is set as the upper limit to operate the CPU 11 with power consumption corresponding to a task to be executed.

Since the performance mode 401 gives priority to performance over quietness, the rotational speed of the cooling fan 35 is first increased up to a settable upper-limit speed when the temperature rises. If the detected temperature further rises even when the rotational speed of the cooling fan 35 is controlled as mentioned above, it will be better to lower the performance step. As an example, the performance mode 401 is executed in a state where the laptop PC stands still on a desk.

The balanced mode 402 is a mode adjusted to take advantages of both the quietness of the quiet mode 403 and the performance of the performance mode 401, which is a mode positioned between the quiet mode 403 and the performance mode 401.

Note that the laptop PC 1 may also be configured to select a proper operating mode according to the usage form of the laptop PC 1. For example, in a usage form (laptop mode) to use the laptop PC 1 on the user's lap, an operating mode to perform such control as to harmonize the performance step and the rotational speed of the cooling fan 35 with each other may be provided. In a usage form (such as the style mode or the dock mode) in which ventilation through the air inlet 81 or the air outlet 83 tends to be restricted, it is better to control the performance step and the rotational speed of the cooling fan 35 within a predetermined range. The style mode and the dock mode to be described later are examples of the above-mentioned fixed mode 410.

Referring next to FIG. 7, tasks in an executable state and a classification thereof will be described.

FIG. 7 is a diagram for describing tasks in the executable state and the classification thereof.

The tasks in the executable state are roughly divided into three types, i.e., "App," "Background Process," and "OS Process," and an example of a task list for managing these tasks is illustrated.

"Application 1" to "Application 4" classified as "App" are an example of application programs mentioned above. These application programs are identified by each identification information such as "Application 1" illustrated in FIG. 7. "BG Process 1" to "BG Process 4" classified as "Background Process" are an example of background processes mentioned above. These background processes are identified by each identification information such as "BG Process 1" illustrated in FIG. 7. The "OS Process" includes unillustrated plural processes.

Each task associated with each line of this task list can be managed as a thread and executed individually. A numerical value at the right end in association with each task indicates the CPU utilization rate of each task. A numerical value at the top of these numerical values indicates the CPU utilization rate of all tasks being executed.

This task list illustrated in FIG. 7 may also be used as a running task list to be described later. In the embodiment, Tasks classified as "App" are called "foreground tasks" and denoted by FGT. Tasks classified as "Background Process" and "OS Process" are called "background tasks" and denoted by BGT. In other words, the tasks classified as "App" are, for example, such tasks as to cause visible windows to be displayed on the display surface FS1.

For example, the background tasks may also include a task by an update processing program, or a background-process task launched by software for verifying information security.

FIG. 8 is a diagram for describing a background task list.

In the background task list (called a BG task list below), data (called target task information below) for identifying tasks required to be handled as specific background tasks are prestored. "BG Process 1" and "BG Process 2" are an example of target tasks required to be handled as specific background tasks. "BG Process 1" may be associated with the above-mentioned update processing unit 121, and "BG process 2" may be associated with the above-mentioned security processing unit 123.

Figure 9:
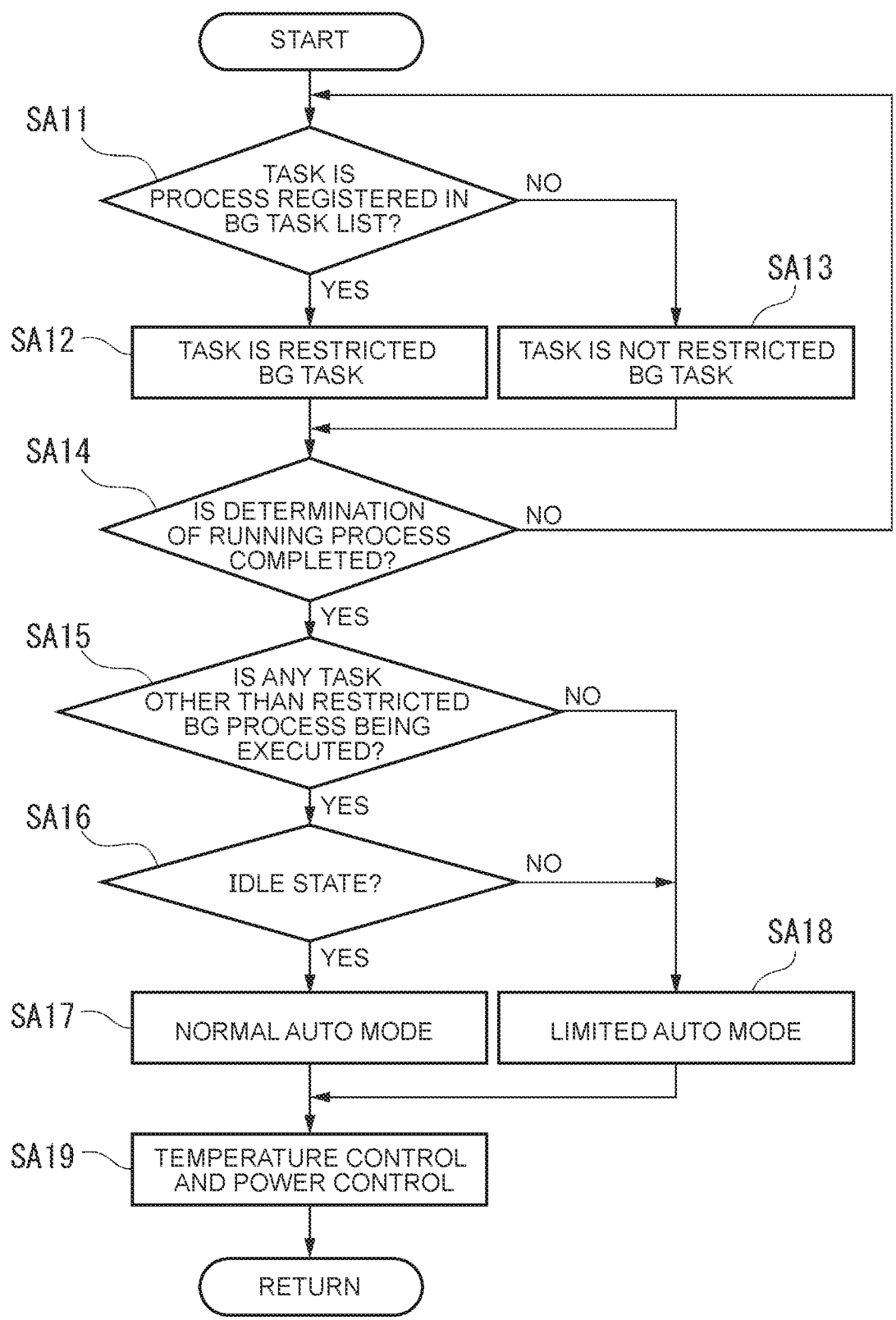
FIG. 9 is a flowchart illustrating a procedure of operating mode control.

FIG. 9 is a flowchart illustrating a procedure of operating mode control.

The power management driver 111 refers to the running task list and the BG task list to determine whether each task included in the running task list is a process (target task) registered in the BG task list or not (step SA11).

When the task is a process registered in the BG task list, the power management driver 111 determines that the task is a restricted BG task (step SA12).

When the task is not a process registered in the BG task list, the power management driver 111 determines that the task is not a restricted BG task (step SA13).

The power management driver 111 determines whether the determination of the running process(es) is completed or not (step SA14), and when the determination is incomplete, the processing from step SA11 is executed. Thus, the power management driver 111 identifies a target task to make a target schedule task identifiable from among plural schedule tasks executed by the CPU 11.

When the above processing is completed, the power management driver 111 determines whether any task other than the process determined to be the restricted BG task is being executed or not (step SA15).

When any task other than the process determined to be the restricted BG task is being executed, the power management driver 111 determines whether the laptop PC 1 is in the idle state or not (step SA16). When the laptop PC 1 is not in the idle state, the power management driver 111 specifies the execution of a normal auto mode (step SA17), and the procedure proceeds to step SA18. The normal auto mode is the auto mode 400 in which the performance mode setting is not limited.

On the other hand, when any task other than the process determined to be the restricted BG task is not being executed, or when the laptop PC 1 is in the idle state, the power management driver 111 executes an auto mode in which the performance mode setting is limited (step SA18). The auto mode in which a limit is set as mentioned above is a limited auto mode 404 in which the performance mode setting is limited. Thus, based on the target task information and execution state information indicative of the execution state (idle state) of the CPU 11, the power management driver 111 switches between the auto mode 400 and the limited auto mode 404.

The power management driver 111 notifies the above determination result to the control unit 100. The control unit 100 performs temperature control and power control based on the determination result (step SA19). For example, the control unit 100 causes the embedded controller 31 to control the cooling fan 35 to control the performance of the CPU 11. Then, the above-mentioned series of processing is ended.

According to the above-mentioned processing, when the restricted BG task is launched, or when the laptop PC 1 is in the idle state, the laptop PC 1 is controlled within a range of the limited auto mode 404, and the transition to the performance mode 401 is restricted. This restricted state is released when the restricted BG task is finished.

Any of the above-described techniques may be applied to detect that the laptop PC 1 is in the idle state.

In the BG task list of the above-mentioned processing, it is a case where a restricted BG task is registered, but any BG task other than the restricted BG task may be registered instead. In such a case, the processing logic may be changed not to logically contradict the determination in the above-mentioned processing.

According to the above-mentioned embodiment, the laptop PC 1 of the embodiment detects processing executed by the CPU 11 (processor). The laptop PC 1 includes the display unit 14 on which the status of processing executed by the CPU 11 is displayed, and the power management driver 111 (switching unit). The power management driver 111 (switching unit) relates to the auto mode 400 (first adjustment mode) which sets, as a target for selection, a first selection range including plural processing power classes classified according to the magnitude of processing power, and the limited auto mode 404 (second adjustment mode) which sets, as a target for selection, inside of a second selection range in which the "performance mode (first processing power class)" related to relatively high processing power is excluded from among the "performance mode (first processing power class)," the "balanced mode (second processing power class)," and the "Quiet mode (third processing power class)" of the first selection range. The power management driver 111 (switching unit) switches between the auto mode 400 and the limited auto mode 404 in association with predetermined processing executed without displaying the execution status on the display unit 14.

Thus, the laptop PC 1 of the embodiment can suppress the heat generation of the information processing apparatus with the user's operation suspended.

For example, in the laptop PC 1 of the embodiment, plural operating modes defining the operation of the CPU 11 may be defined according to the magnitude of processing power. The plural operating modes may include a first operating mode associated with the first processing power class, a second operating mode associated with the second processing power class lower in processing power than the first processing power class, and a third operating mode associated with the third processing power class lower in processing power than the second processing power class. The power management driver 111 may select the first adjustment mode to make processing of the CPU 11 executable in operating modes including the first operating mode to the third operating mode, or select the second adjustment mode to make the processing of the CPU 11 executable in any of operating modes including the second operating mode and the third operating mode. Thus, upon switching between the auto mode 400 and the limited auto mode 404, the power management driver 111 of the laptop PC 1 of the embodiment can include the second operating mode and the third operating mode in the limited auto mode 404 to execute the processing of the CPU 11.

When at least either the fact that there is a schedule task to be executed or a state in which a condition for executing a schedule task with a limited throughput is met is detected, the power management driver 111 of the laptop PC 1 of the embodiment may make a determination to switch between the auto mode 400 (first adjustment mode) and the limited auto mode 404 (second adjustment mode).

Thus, when at least either the fact that there is a schedule task to be executed or the state in which a condition for executing a schedule task with a limited throughput is met is detected, the laptop PC 1 of the embodiment can make a predetermined determination to switch between the auto mode 400 and the limited auto mode 404 based on the determination result.

The power management driver 111 may target a schedule task, in which an execution trigger occurs when the laptop PC 1 is in the idle state, for controlling the throughput of the CPU 11.

The power management driver 111 in the laptop PC 1 of the embodiment may switch between the auto mode 400 and the limited auto mode 404 based on target task information for making the target schedule task identifiable from among plural schedule tasks executed by the CPU 11, and execution state information indicative of the execution state of the CPU 11. This can switch between the auto mode 400 and the limited auto mode 404.

Note that, when the power management service unit 126 detects processing executed by the CPU 11, the power management driver 111 may detect that there is a schedule task required to be executed with a limited throughput. The power management driver 111 can execute the schedule task with the limited throughput by detecting that there is the schedule task required to be executed with the limited throughput.

Modification of First Embodiment

A modification of the first embodiment will be described. In the first embodiment, the example in which a limit is set in the performance mode setting as a result of the determination as to whether any process other than the processes determined to be the BG tasks is being executed or not is described. In this modification, an example in which the result of a determination on the CPU utilization rate of a running process is added to the determination in addition to the above will be described.

Figure 10:
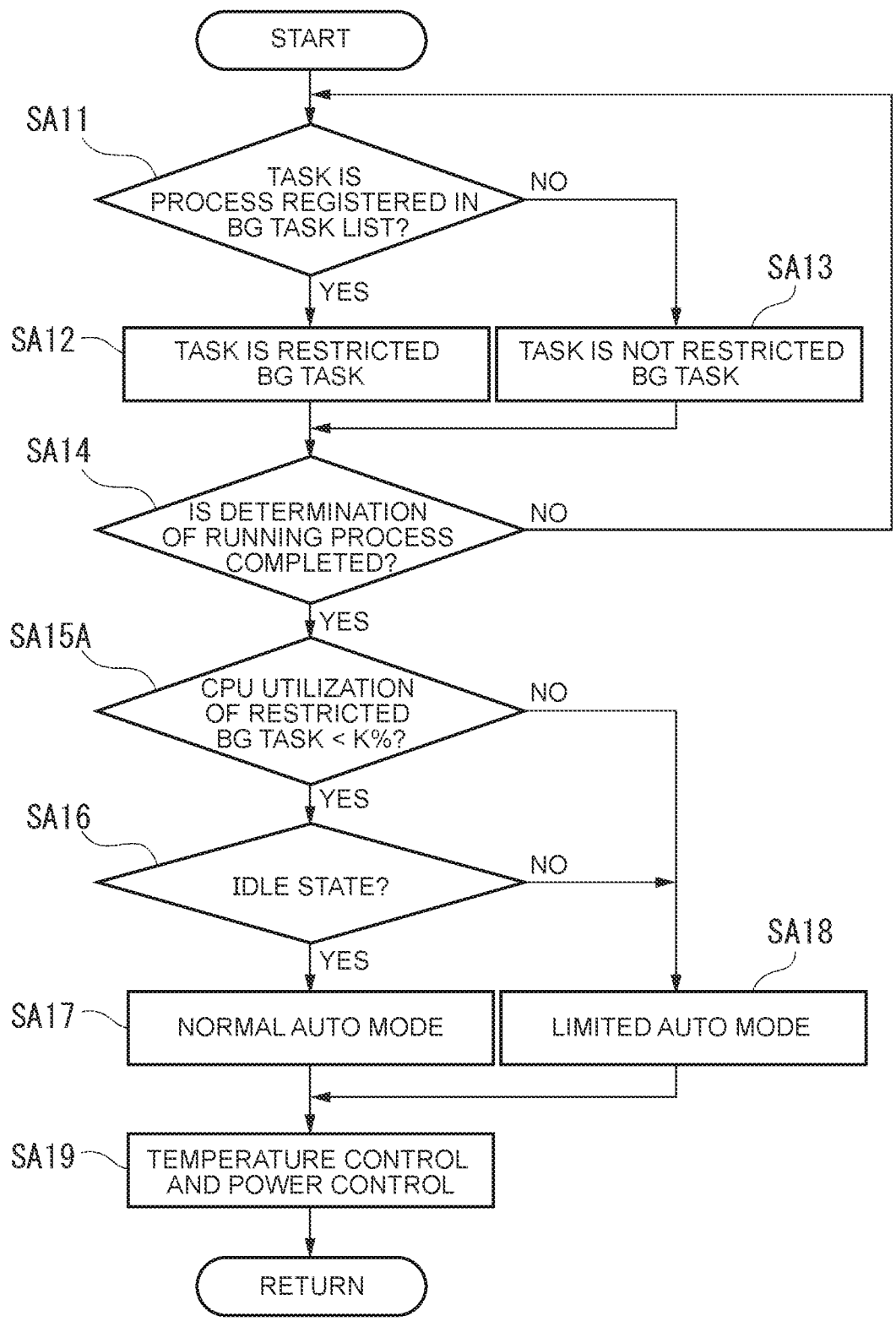
FIG. 10 is a flowchart illustrating a procedure of operating mode control of a modification.

FIG. 10 is a flowchart illustrating a procedure of operating mode control of the modification.

In the modification, like in the embodiment, after performing processing step SA11 to step SA14, the power management driver 111 determines whether the CPU utilization rate of a process determined to be a restricted BG task is less than k % or not (step SA15A). Note that the magnitude of k is, for example, a positive real number relatively close to 0, and when this is represented by a natural number, it may be a value such as 1, 2, or the like.

When the CPU utilization rate of the process determined to be the BG task is less than k %, the power management driver 111 executes the normal auto mode (step SA16), and causes the processing to proceed to step SA19.

On the other hand, when the CPU utilization rate of the process determined to be the BG task is equal to or more than k %, the power management driver 111 executes an auto mode (limited auto mode 404) with a limit set in the mode setting in such a way as not to become the performance mode (step SA18).

Like in the embodiment, the power management driver 111 notifies the control unit 100 of the above determination result. The control unit 100 performs temperature control and power control based on the determination result (step SA19). For example, the control unit 100 causes the embedded controller 31 to control the cooling fan 35, further controls the performance of the CPU 11, and then ends the above-mentioned series of processing.

Note that this processing is performed every predetermined cycle. As for the CPU utilization rate referred to in step SA15A, an instantaneous value detected in the cycle may be used.

As mentioned above, in a case where the utilization rate of the CPU 11 in relation to the target schedule task defined in the target task information is less than a predetermined threshold value, the power management driver 111 does not make the case a requirement for switching to the limited auto mode 404 (second adjustment mode). Therefore, even if the processing load associated with any other task increases when the CPU utilization rate of the restricted BG task is relatively low, the other task can be adjusted within the range of the auto mode 400 without setting any limit thereon. In addition to the above, the modification also has the same effect as the embodiment.

Second Embodiment

Next, a second embodiment will be described.

Figure 11:
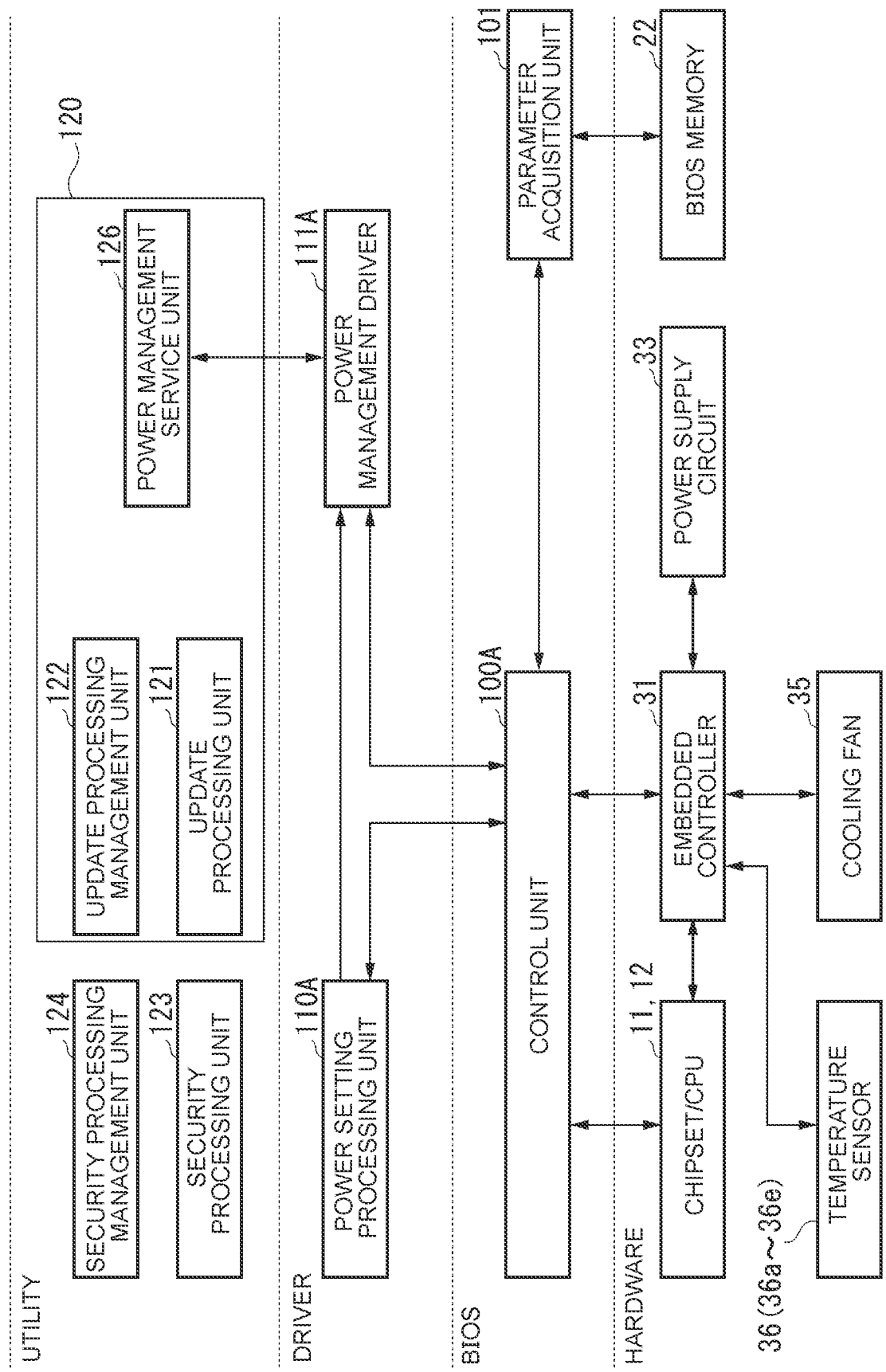
FIG. 11 is a block diagram illustrating an example of the functional configuration of a laptop PC 1 of a second embodiment.

Referring to FIG. 11, a data flow of operating mode control of this embodiment will be described.

FIG. 11 is a block diagram illustrating an example of the functional configuration of a laptop PC 1 according to the second embodiment.

The laptop PC 1 includes a control unit 100A, the parameter acquisition unit 101, a power setting processing unit 110A, a power management driver 111A, the update processing unit 121, the update processing management unit 122, the security processing unit 123, the security processing management unit 124, and the power management service unit 126. The control unit 100A, the power setting processing unit 110A, and the power management driver 111A correspond to the control unit 100, the power setting processing unit 110, and the power management driver 111 described above.

In the following, the details of the control unit 100A, the power setting processing unit 110A, and the power management driver 111A will be described mainly by focusing on differences from the control unit 100, the power setting processing unit 110, and the power management driver 111. Note that the power management driver 111A of the embodiment may also be configured as an ITS driver (Intelligent Thermal Solution Driver).

FIG. 12 to FIG. 14 are diagrams for describing information related to power control of the embodiment.

A DYTC table illustrated in FIG. 12 is a table used to maintain the control state of the control unit 100A. For example, the DYTC table may be provided in the control unit 100A.

The DYTC table includes items such as Mode, Classification, Selection Result, and the like. In the Mode item, identification data for identifying a selectable operating mode is stored. When there is an operating mode to be controlled by dividing it into two or more cases in the operating mode, identification data for identifying each case is stored in the Classification item. In the Selection Result item, the results of the selected operating mode and the classification are stored.

For example, the control unit 100A determines an operating mode based on various kinds of information such as the detection results of various sensors. In addition to PSC information to be described later, for example, the above-mentioned various kinds of information include a detected value by the acceleration sensor 37, information based on the opening/closing state of the chassis BD (Style information), information indicative of a state of being mounted on the dock by the power supply circuit 33 (Dock information), and the like. The operating modes are roughly divided into the auto mode (Auto), the style mode (Style), and the dock mode (Dock). The style mode (Style) and the dock mode (Dock) correspond to the usage form as illustrated in FIG. 1A. The auto mode (Auto) is applied to the laptop mode as the usage form illustrated in FIG. 1A. When the control unit 100A adds the above information to the DYTC table, information related to each operating mode mentioned above is stored.

Further, information for identifying a case with a BG task and a case without a BG task in the auto mode is stored in the DYTC table. For example, the determination results by the control unit 100A in that the case with a BG task in the auto mode and the case in the style mode are invalid (No) and the other cases are valid (Yes) are added.

A DPTF condition table illustrated in FIG. 13 is a table used by the power setting processing unit 110 to determine an operating mode. The DPTF condition table is, for example, provided by the power setting processing unit 110. The DPTF condition table includes respective items of Priority, Mode, Condition 2, Condition 1, and Duration.

The Priority item indicates the upper limit of a selectable range among selectable operating modes, where the smaller the value, the higher the priority. The Mode item indicates the name of each of selectable operating modes. From the smallest number of the priority mentioned above, the names of "Performance," "Balanced," "Quiet," "Balanced," "Dock," and "Style" are given. "Performance" corresponds to the performance mode. The "Balanced" corresponds to the balanced mode. "Quiet" corresponds to the Quiet mode. "Dock" corresponds to the dock mode. "Style" corresponds to the style mode. In the case of the style mode, since no priority is given, the style mode is set to be excluded from priority control to be described later.

Information for specifying a specific operating mode is stored in the item of Condition 2. For example, in the case of "Performance" with a priority of "1," "Without background task (BGT)" indicating that mode limit control based on a background task is not applied is written. Further, in the case of "Style," "Style" indicating that "Style" mode-specific control is performed is written. No information is written in respective items of the "Balanced", "Quiet", and "Dock" except for "With background task (BGT)" indicating that mode limit control based on a background task is applied.

In respective items of Condition 1 and Duration, the power consumption of the CPU 11 and a condition for executing mode control based on the duration of the power consumption state are defined.

For example, when a state where the power consumption of the CPU 11 is P1 (W) or more has lasted for T1 (sec) or more, "Performance" mode with the priority of "1" is selected. When a state where the power consumption of the CPU 11 is P2 (W) or more has lasted for T2 (sec) or more, "Balanced" mode with a priority of "2" is selected. When a state where the power consumption of the CPU 11 is P1 (W) or less has lasted for T3 (sec) or more, "Quiet" mode with a priority of "3" is selected. When a state where the power consumption of the CPU 11 is P4 (W) or more has lasted for T3 (sec) or more, "Balanced" mode with a priority of "4" is selected. The above-mentioned power consumption amounts P1 to P4 may be made smaller, for example, in order of P4, P1, and P2. The above-mentioned duration lengths T1 to T3 may be made smaller, for example, in order of T1, T2, and T3.

Based on the amount of the power consumption of the CPU 11 and the time during which the state of the amount of power consumption lasts (duration) using the DPTF condition table defined as mentioned above, an operating mode may be selected and specified by the priority number thereof. Note that the following rule may be applied as a prioritized selection rule.

As an example of the rule, it is defined that any operating mode higher in priority than the specified operating mode cannot be selected. For example, when the priority of 1 is selected, each of modes with priority numbers larger than 1 (for example, all modes from 1 to 5) is selectable. When the priority of 2 is selected, each of modes with priority numbers larger than 2 (for example, modes from 2 to 5) is selectable, but the mode with the priority number of 1 cannot be selected.

A DPTF action table illustrated in FIG. 14 is a table used by the power setting processing unit 110 to determine a command value related to power control. The DPTF action table includes respective items of Mode, Power Limit, and Fan Table.

In the item of Mode, the name of each of selectable operating modes is stored. In the item of Power Limit, each upper limit value of power consumption allowed for the CPU 11 is stored. In the item of Fan Table, each piece of identification information of the temperature control data table (for example, each of TAT_A to TAT_E) to be notified to the embedded controller 31 or the like is stored. As mentioned above, the temperature control data table is a table set for each operating mode and used by the embedded controller 31 to perform temperature control such as to control the cooling fan.

For example, when a temperature control data table is specified by using identification information of the temperature control data table, the embedded controller 31 controls the cooling fan 35 based on the identification information of the temperature control data table. In addition, when the identification information of the temperature control data table transmitted to the embedded controller 31 is relayed, the power management driver 111 identifies the identification information of the temperature control data table to identify an operating mode based thereon.

For example, when the identification information of the temperature control data table is TAT_A, the power management driver 111 identifies that the performance mode 401 is selected, and identifies that a situation without any BG task from the situation that this performance mode 401 is selected. On the other hand, when the identification information of the temperature control data table is TAT_B or TAT_C, the power management driver 111 can identify that the balanced mode 402 or the quiet mode 403 is selected. However, when the identification information of the temperature control data table is TAT_B or TAT_C, the power management driver 111 cannot confirm whether there is a BG task or not.

Figure 15:
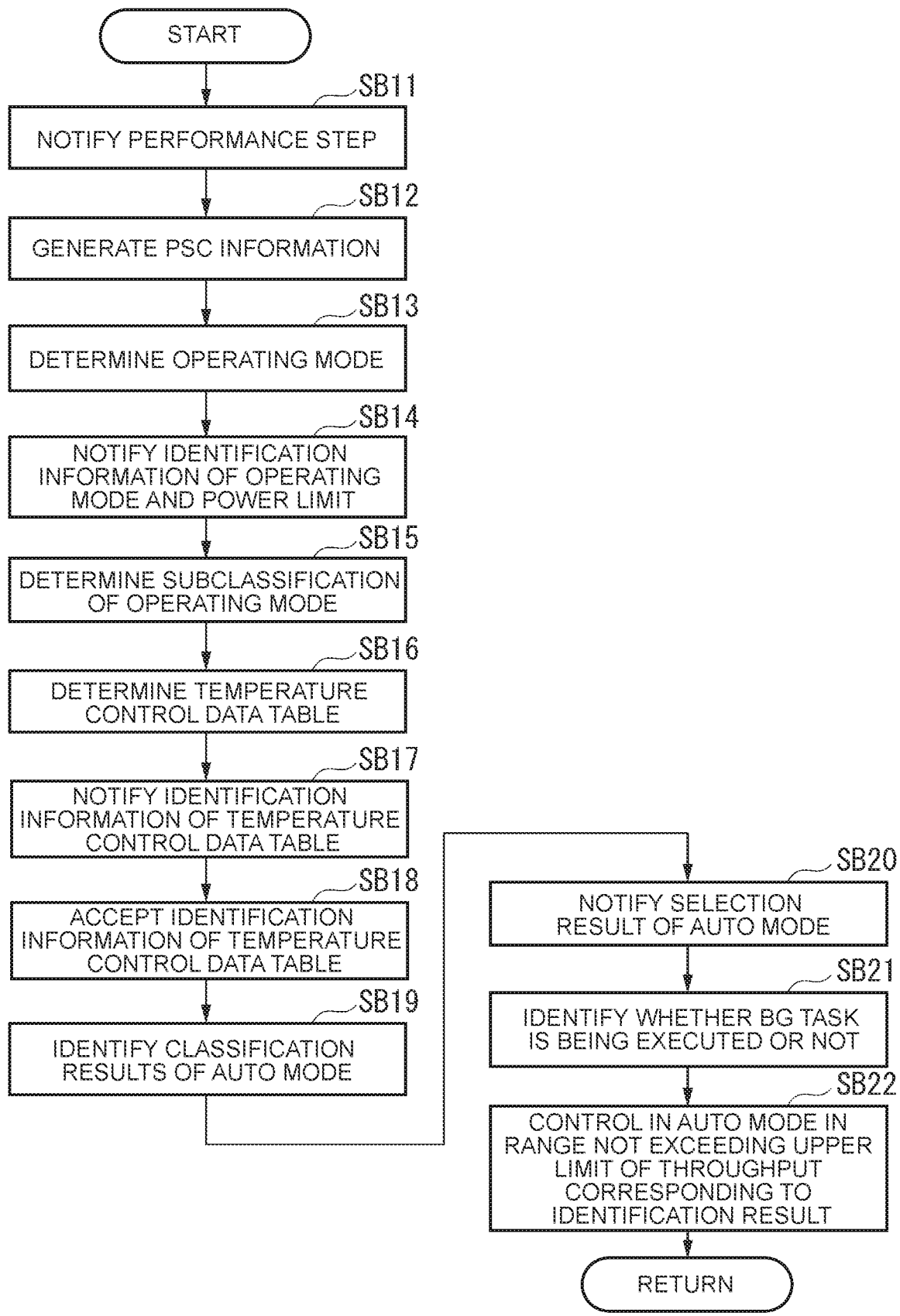
FIG. 15 is a flowchart illustrating a procedure of operating mode control of the second embodiment.

Referring to FIG. 11 described above and FIG. 15, operating mode control of the embodiment will be described. FIG. 15 is a flowchart illustrating a procedure of operating mode control of the second embodiment.

The power management service unit 126 notifies the power management driver 111A of the above-described performance step according to the processing executed by the CPU 11 (step SB11).

The power management driver 111A acquires the above performance step from the power management service unit 126, acquires information from the power setting processing unit 110, generates PSC (Power Slider Condition) information based on these acquisitions (step SB12), and supplies this information to the control unit 100. For example, the above-mentioned PSC information includes information for power control and operating mode selection. More specifically, based on the performance step generated by the power management service unit 126, the power management driver 111A generates PSC information for power control by the control unit 100. Note that an example of information from the power setting processing unit 110 is identification information of the temperature control data table generated as a command value for controlling the cooling fan 35. The generation of this information will be described.

The control unit 100A determines an operating mode based on various kinds of information such as the detection results of various sensors (step SB13). For example, the various kinds of information mentioned above include, in addition to the above-mentioned PSC information, a detected value by the acceleration sensor 37, opening/closing information of the chassis BD (Style information), information indicative of a state of being mounted on the dock by the power supply circuit 33 (Dock information), and the like.

For example, based on the various kinds of information mentioned above, the control unit 100A selects a specific operating mode from among three operating modes, i.e., the auto mode, the style mode, and the dock mode. The control unit 100A performs processing for confirming the classification of the auto mode, but there is no information that requires the limited auto mode 404 at the initial stage. Therefore, the control unit 100A selects, for example, the auto mode 400 as the initial value.

The control unit 100A notifies the power setting processing unit 110A of identification information of the selected operating mode and an instruction to change the upper limit of the power consumption of the CPU 11 ("Power Limit") (step SB14).

The power setting processing unit 110A accepts the identification information of the selected operating mode and the instruction to change the upper limit of the power consumption of the CPU 11 from the control unit 100A as information on the operating status of the CPU 11. The power setting processing unit 110A uses the DPTF condition table based on the above information on the operating status of the CPU 11 to determine the subclassification of an operating mode suitable for the operating status (step SB15). Further, the power setting processing unit 110A uses the DPTF condition table and the DPTF action table to determine the subclassification of the operating mode in order to determine a temperature control data table corresponding to the subclassification of the operating mode (step SB16). The power setting processing unit 110 notifies identification information of the determined temperature control data table (step SB17).

The power management driver 111A accepts the identification information of the temperature control data table notified from the power setting processing unit 110A (step SB18), and identifies the classification results of the auto mode based on this identification information (step SB19).

The power management driver 111A switches to either one of the auto mode 400 and the limited auto mode 404 according to the classification results of the auto mode, and notifies the control unit 100A of this selection result (step SB20). This notification corresponds to a notification in a control cycle subsequent to the control cycle related to the notification at step SB14 mentioned above.

The control unit 100A accepts the classification results of the auto mode notified from the power management driver 111, and identifies, according to the classification results, whether the state is a state where a BG task is being executed or not (step SB21). According to this identification result, the control unit 100A determines the classification of the auto mode to be either one of the auto mode 400 and the limited auto mode 404.

The control unit 100A performs control in the auto mode corresponding to the above-mentioned identification result (step SB22). Thus, the control unit 100A can prevent the operating mode from making a transition to the performance mode 401 in response to an excessive value of the performance step from the power management service unit 126.

The above-mentioned control causes the power management driver 111 to limit the value of the performance step to the upper limit value of the limited auto mode 404 even when the performance step from the power management service unit 126 is excessive in such a state that the limited auto mode 404 is set. Thus, the transition to the performance mode 401 in response to the excessive value of the performance step from the power management service unit 126 can be prevented.

In step SB13, the case where the auto mode 400 is selected as the initial value is exemplified, but the present invention is not limited to this case, and the limited auto mode 404 may also be selected. Even when the auto mode 400 is selected as the initial value, if the above-mentioned control cycle is repeated in sufficiently short cycles, the limited auto mode 404 can be selected in the subsequent control cycle or the like to limit the value of the performance step without the transition to the performance mode 401.

As mentioned above, the control unit 100A controls the embedded controller 31 based on the performance step from the power management service unit 126. Further, the control unit 100A indirectly detects a control mode based on the identification information of the temperature control data table determined by the power setting processing unit 110A to identify whether the auto mode is set to either the auto mode 400 or the limited auto mode 404.

The laptop PC 1 of the embodiment includes the CPU 11 the processing power of which is adjustable to control the throughput of the CPU 11.

The power management service unit 126 detects processing executed by the CPU 11. Processing such as processing of the update processing unit 121A or processing of the security processing unit 123A is an example of processing executed by the CPU 11.

Like in the first embodiment, the power management driver 111A switches between the auto mode 400 and the limited auto mode 404.

According to the laptop PC 1 of the embodiment, for example, processing such as processing of the update processing unit 121A or processing of the security processing unit 123A is determined to be processing executed by the CPU 11 to enable switching between the auto mode 400 and the limited auto mode 404.

The power management driver 111A on the laptop PC 1 of the embodiment may detect such a state that a condition for executing a target schedule task defined in target task information by limiting the throughput of the target schedule task is met to determine that the condition for executing the target schedule task by limiting the throughput of the target schedule task is met according to the throughput of a background task executed by the CPU 11.

According to the laptop PC 1 of the embodiment, the heat generation of the information processing apparatus with the user's operation suspended can be suppressed by limiting the throughput of the target schedule task according to the throughput of the background task executed by the CPU 11.

For example, as illustrated in step SB15 mentioned above, the power setting processing unit 110A uses the DPTF condition table based on the information on the operating status of the CPU 11 including the identification information of the operating mode to determine the subclassification of the operating mode suitable for the operating status. In such a situation, when the power management service unit 126 specifies a specified value based on an indicator of the throughput of the CPU 11, the power management driver 111A may adjust the upper limit of the throughput of the CPU 11 accordingly based on the above-mentioned specified value and the detection result of processing executed by the CPU 11 to control the control unit 100A. According to the laptop PC 1 of the embodiment, the upper limit of the throughput of the CPU 11 can be adjusted.

When the power management service unit 126 detects the processing to be executed by the CPU 11, the power management driver 111A may be configured to detect such a state that a condition for executing a schedule task by limiting the throughput of the schedule task is met. This detection result can cause the power management driver 111A to execute the schedule task by limiting the throughput of the schedule task.

For example, in the above case, the power management driver 111A may determine that the condition for executing the schedule task by limiting the throughput of the schedule task is met according to the throughput of the background task executed by the CPU 11. For example, when the throughput of the background task executed by the CPU 11 exceeds a predetermined amount, the power management driver 111A may execute the schedule task by limiting the throughput of the schedule task.

Modification of Second Embodiment

A modification of the second embodiment will be described. In the second embodiment, the case of control using, as a condition, the throughput of a background task executed by the CPU 11 is described. In this modification, a case of control using the CPU utilization rate of the background task and the CPU utilization rate of a foreground task will be described instead.

For example, the power management driver 111A may make the following determination: Among tasks executed by the CPU 11, when a background task with a throughput exceeding a predetermined ratio to the throughput of the CPU 11 is included, the power management driver 111A may determine that a condition for executing the schedule task by limiting the throughput of the schedule task is met.

For example, when the CPU utilization rate of a background task is denoted by BGTr and the CPU utilization rate of a foreground task is denoted by FGTr, Equation (1) using these parameters are defined below.

$$K=(BGTr)/(BGTr+FGTr)>TH \quad (1)$$

Equation (1) mentioned above is to calculate a ratio K of the CPU utilization rate BGTr to a total value of the CPU utilization rate BGTr and the CPU utilization rate FGTr. As expressed in Equation (1), when the ratio K becomes larger to exceed a threshold value TH, the power management driver 111A may execute the schedule task by limiting the throughput of the schedule task. On the other hand, when the ratio K is not so large to exceed the threshold value TH, the power management driver 111A may execute the schedule task without limiting the throughput of the schedule task.

When a background task with a throughput exceeding the predetermined ratio to the throughput of the CPU 11 is included in tasks executed by the CPU 11, the power management driver 111A may perform the above-mentioned determination processing. For example, when this condition is met, the power management driver 111A may select the limited auto mode 404.

According to the modification, not only can the same effect as in the second embodiment be attained, but also control can be performed by a method suitable for a state based on the relationship between the throughput of a background task, the throughput of which exceeds the predetermined ratio to the throughput of the CPU 11, and the throughput of a foreground task.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1 laptop PC, 11 CPU (processor), 21 chipset, 31 embedded controller, 35 cooling fan, 36 temperature sensor, 100 control unit (BIOS), 101 parameter acquisition unit, 110 power setting processing unit, 111 power management driver, 120 OS, 121 update processing unit, 122 update processing management unit, 123 security processing unit, 124 security processing management unit, 126 power management service unit, 400 auto mode, 401 performance mode, 403 quiet mode, 404 limited auto mode, 410 fixed mode, 420 power-saving mode, BD chassis

What is claimed is:

1. A computing device comprising:
   a memory; and
   a processor that executes code stored on the memory to execute an operation system (OS) and run a plurality of background tasks on the OS, wherein
   the processor operates according to a plurality of processing power classes that each include a processing power limit, where a first processing power class of the plurality of processing power classes has the highest processing power limit,
   the processor further executes code stored on the memory to:
      in response to an event trigger, enter an auto power mode that operates the processor according to one of the plurality of processing power classes, including the first processing power class,
      determine, while in the auto power mode, whether a predetermined background task is running among the plurality of background tasks, and
      upon determining that the predetermined background task is running, enter a restricted auto power mode that operates the processor according to one of the plurality of processing power classes, excluding the first processing power class,
   the processor enters the restricted auto power mode based on:
      target task information that identifies the predetermined background task among the plurality of background tasks, and
      execution state information that indicates an execution state of the processor,
   when a utilization rate of the processor related to the predetermined background task is less than a predetermined threshold value, the processor does not take the utilization rate as a requirement for entering the restricted auto power mode, and
   when the processor detects a state that includes a condition for executing the predetermined background task with a limited throughput of the processor, the processor determines, based on a throughput of the predetermined background task, whether the condition for executing the predetermined background task with a limited throughput is met.

2. The computing device of claim 1, wherein
   the predetermined background task does not generate an information display screen on a display of the computing device.

3. The computing device of claim 2, wherein
   the predetermined background task includes a second program related to a first program that displays the information display screen on the display, and
   the second program is executed independently of the first program.

4. The computing device of claim 1, wherein
   the predetermined background task includes a process executed independently of a related application program under an operating condition defined by the application program.

* * * * *